United States Patent
Shaffer et al.

(10) Patent No.: US 6,249,308 B1
(45) Date of Patent: Jun. 19, 2001

(54) METHOD OF CONTROLLING PEAK POWER OF A RADIANT ENERGY EMITTING SYSTEM

(75) Inventors: Wayne K. Shaffer, Penfield; David C. Press, Webster, both of NY (US); Gregory A. Smith, Fort Collins, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/490,512

(22) Filed: Jan. 25, 2000

(51) Int. Cl.$^7$ ........................................ B41J 15/14
(52) U.S. Cl. ............................ 347/241; 347/236
(58) Field of Search .................... 347/241, 246, 347/236, 251, 253; 219/121.61, 121.73; 355/68; 356/446; 359/566, 888

(56) References Cited

U.S. PATENT DOCUMENTS

| | | | |
|---|---|---|---|
| 4,561,721 | * | 12/1985 | Keilmann et al. .................. 359/566 |
| 4,676,653 | * | 6/1987 | Strohmeier et al. ................. 356/446 |
| 5,609,780 | * | 3/1997 | Freedenberg et al. .......... 219/121.73 |
| 5,627,627 | * | 5/1997 | Suzuki .................................. 355/68 |
| 5,940,115 | * | 8/1999 | Nakamura et al. .................. 347/251 |

FOREIGN PATENT DOCUMENTS 4-037079  *  2/1992  (JP) .

* cited by examiner

Primary Examiner—N. Le
Assistant Examiner—Hai C. Pham
(74) Attorney, Agent, or Firm—Clyde E. Bailey, Sr.

(57) ABSTRACT

A method of controlling peak power of a radiant energy emitting system, such as lasers adapted for use in laser edge marking apparatus, reduces fog spots on the web caused by impinging laser energy. A laser printer has an attenuating member provided in the optical path of a laser beam tube for controlling peak power to each one of the plurality of lasers.

8 Claims, 5 Drawing Sheets

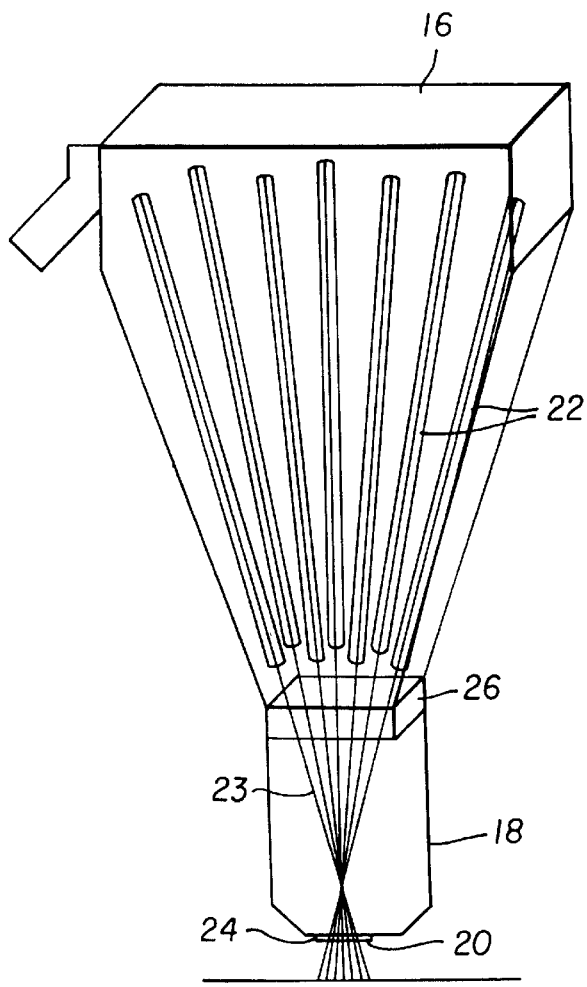
FIG. 2a
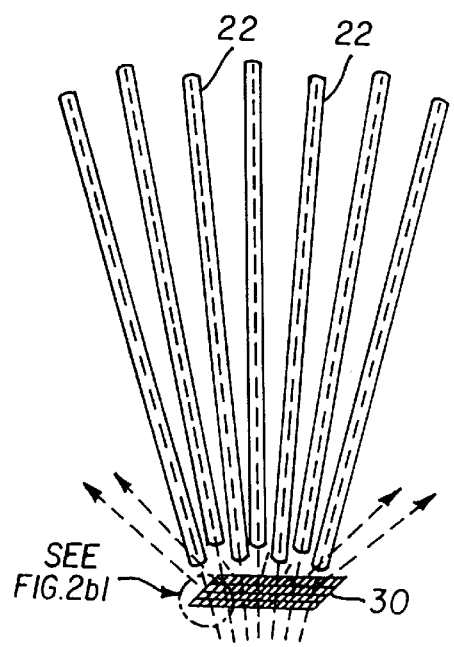
FIG. 2b
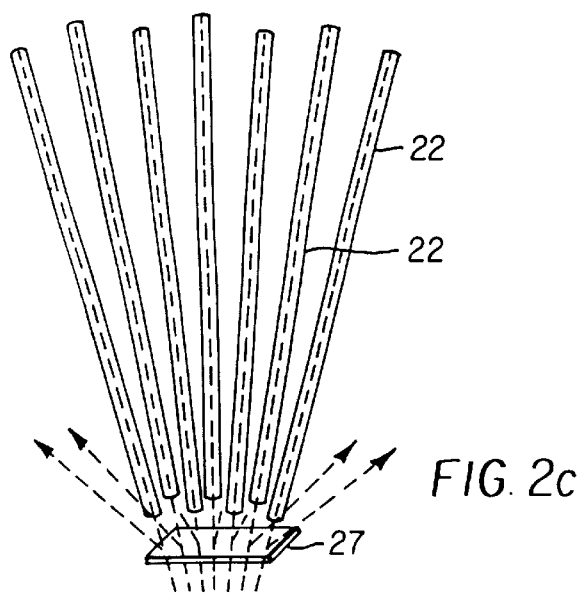
FIG. 2c
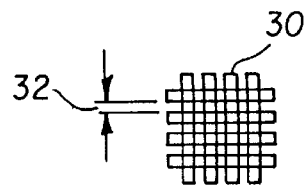
FIG. 2b1

METHOD OF CONTROLLING PEAK POWER OF A RADIANT ENERGY EMITTING SYSTEM

FIELD OF THE INVENTION

The invention relates generally to the field of radiant energy emitting systems. More particularly, the invention concerns a method that uses laser energy for marking indicia on photosensitive web with a dramatic reduction in the occurrence of fog on the photosensitive web.

BACKGROUND OF THE INVENTION

Conventional edge marking in photographic film manufacturing involves printing some sort of identification indicia along the edge of film rolls during the finishing operation. Edge marked film has direct verification of roll identity, sheet identity and waste identity during all stages of the manufacturing process. Importantly, edge marked film provides accurate footage identification that enables operators to quickly identify, trace and remove film imperfections, thereby minimizing the amount of product waste. More generally, edge marked film increases process understanding by allowing process interactions to be more closely identified with their corresponding effect on the product. Traditional embossing marking techniques are being replaced by laser edge marking. Current mechanical embossing techniques (embossing wheels) are not programmable, generate poor quality marks and require excessive maintenance. Laser edge marking, on the other hand, is particularly advantageous in the industry because it provides a permanent record and can be read before and after film processing.

Advances in laser technology enabled the use of a dot matrix $CO_2$ laser marking system to be used to replace existing embossing technology. Off the shelf laser marking equipment will mark the film at required throughput rate, however, an unacceptable level of fog spots occurred.

Thus, a particular shortcoming of these advanced high powered laser systems used for edge marking photosensitive film is that they produce a by-product that impinges on the film surface. Laser energy by-products in the form of a plume of energized smoke and irradiated debris on the film surface is known to cause the localized fogging on the film. Experience has shown that localized fogging is not easily eliminated even when the film is immersed in a 99.8% nitrogen atmosphere.

More recent developments in laser technology enabled the development of high speed marking systems using short pulse lasers. Short pulse laser exposure on photosensitive film shows some promise in reducing the occurrences of fog spots. Our experience also indicates that an air jet directed at the laser impingement point on the film surface further reduce the occurrence of fog. Statistical methods have been employed to gain information on fog incidence reduction when laser marking photosensitive film. It has been experimentally proven that laser pulse width does not have a significant effect on fog. Importantly, however, our experience does suggest that laser peak power has a dramatic effect on the reduction of occurrences of fog spots by a factor of about 30. In addition, significant statistical benefits can be derived from an air jet that we believe can further reduce the incidences of fog spots by a factor of about 10.

Hence, laser marking without controlling peak power will result in 14% to 50% of the laser-generated dots of dot matrix characters to have fog spots around the dots. There are no present attempts known to the inventors to control peak power in laser edge marking devices because embossing techniques still remain prevalent in the industry and, more importantly, the fog spots remain a significant quality issue during the finishing process.

Therefore, a need persists for variable information to be permanently marked on the edge of each sheet of photosensitive web, such as photographic film, without significant incidences of fog spots on the surface of the film.

SUMMARY OF THE INVENTION

It is, therefore, an object of the invention to provide a method for laser marking indicia on a moving photosensitive web while substantially reducing the occurrence of deleterious fog spots on the photosensitive web.

It is another object of the invention to provide a method for exposing a moving photosensitive web to laser energy while controlling the peak power of the laser energy.

Yet another object of the invention is to provide a method for laser printing indicia on a photosensitive web by further directing a jet of air onto the laser energy impinged surface of the photosensitive web.

It is a feature of the invention that the method for laser marking indicia on a moving photosensitive web uses a means for controlling the output peak laser power to each of a plurality of lasers directed at the moving photosensitive web.

To accomplish these and other objects and features and advantages of the invention, there is provided, in one aspect of the invention, a method of controlling peak power of a radiant energy emitting system, comprising the steps of:

providing a source of radiant energy;

providing a printer structurally connected to said source of radiant energy, said printer being provided with a printer head, a radiant energy beam tube connected to said printer head, said radiant energy beam tube having an active end, a photosensitive web for printing indicia thereon, a plurality of radiant energy emitting elements disposed in said printer head for generating a plurality of radiant energy beams, a lens arranged in said radiant energy beam tube for focusing each one of said plurality of radiant energy beams along a predetermined optical path, and a radiant energy beam attenuating member disposed in said optical path for attenuating said radiant beams; and, activating said source of radiant energy so as to energize each one of said plurality of radiant energy emitting elements to direct radiant energy beams through said printer onto said photosensitive web.

It is, therefore, an advantageous effect of the present invention that laser edge markings on photosensitive web can be accomplished with an apparatus and method that is easy to operate, simple and cost effective to produce and that substantially reduces the occurrence of fog spots on the photosensitive web.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2a is a front elevational view of the laser head showing an attenuating herein;

FIGS. 2b and 2b1 is a top elevational view of the mesh screen;

FIG. 2c an isometric view of the beam splitter;

DETAILED DESCRIPTION OF THE INVENTION

Figure 1:
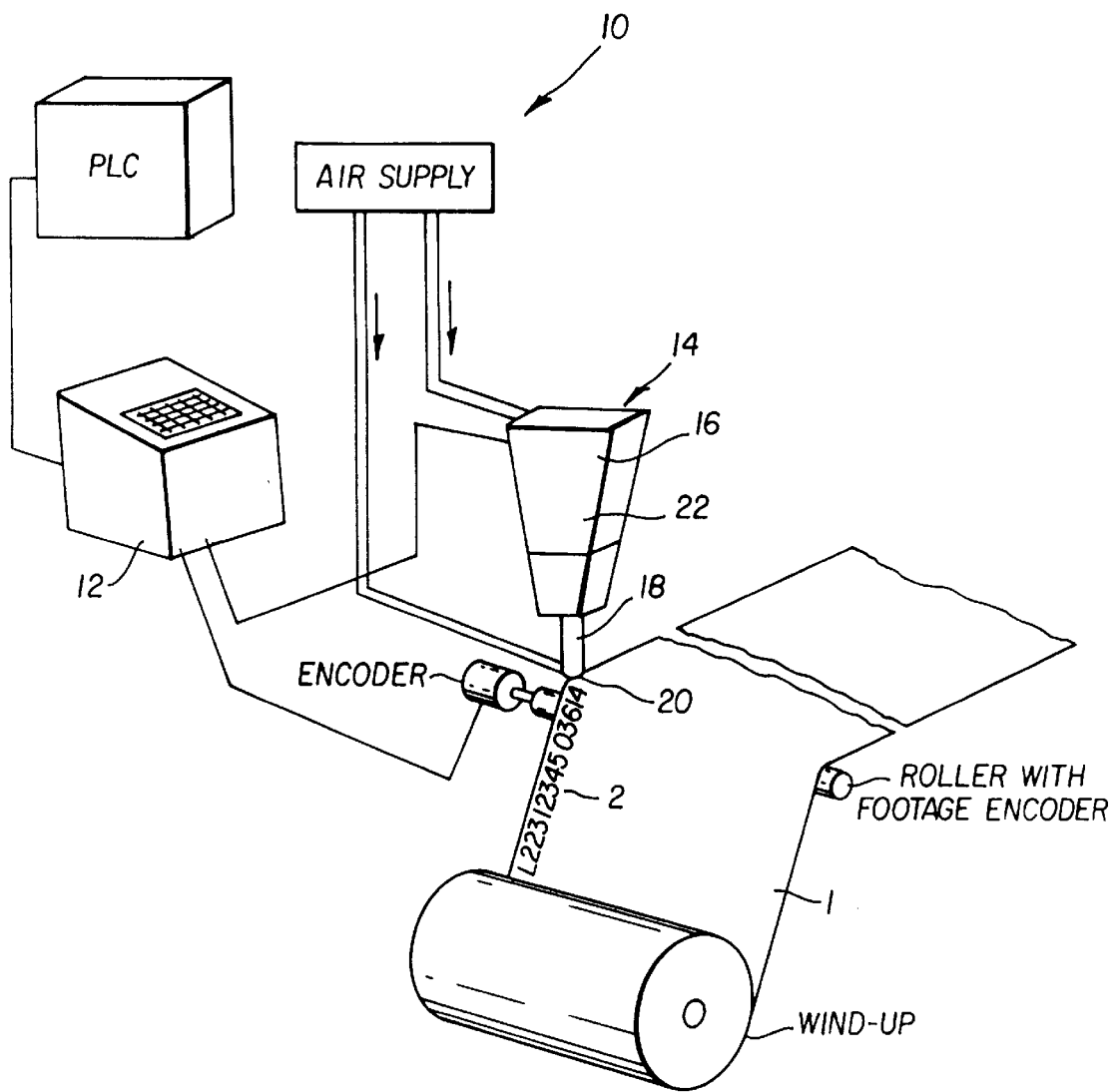
FIG. 1 is a schematic diagram of a laser edge marking system of the invention.

Turning now to the drawings, and in particular to FIG. 1, the apparatus 10, according to the principles of the invention, for printing indicia 2 on a moving radiant energy impingeable surface, such as moving photosensitive web material 1, is illustrated. According to FIG. 1, apparatus 10 has a source 12 of radiant energy, preferably laser energy, for producing a range of power. While other types of radiant energy are contemplated by the invention, such as masers, LED, incandescent, etc., the inventors have limited their inventive concept to laser energy emitting systems, as described in detail below. Thus, a laser printer 14 is operably connected to the source 12 of laser energy.

Referring to FIG. 1, laser printer means 14, preferably a Domino DDC2 Digital Laser Coder, manufactured by Domino Lasers, Inc. of Gurnee, Ill., is provided with laser head 16 and a laser beam tube 18 structurally associated with the laser head 16. Laser beam tube 18 has an active end 20 positioned proximate to the moving photosensitive web material 1 and a plurality of lasers 22 disposed in the laser beam tube 18 for generating a plurality of laser beams.

According to FIGS. 2a, 2b, 2b1, and 2c, in the preferred apparatus 10, seven lasers 22 are employed each being a medium power $CO_2$ laser that operates at about 30 watts maximum power. Each laser 22 corresponds to a row of dots in a dot matrix character. This type of laser 22 has enough power to mark small characters or indicia 2 into photosensitive materials, for example emulsion coated film. At least one lens 24 is arranged in the laser beam tube 18 for focusing each one of the plurality of laser beams along a predetermined optical path 23 (FIG. 2a) and into impinging contact with the laser impingeable material, such as photosensitive web material 1 thereby producing indicia 2 thereon.

Referring to FIGS. 2a–2c, means for controlling peak power, preferably a laser beam attenuating member 26 (FIG. 2a), is disposed in the optical path 23 for attenuating the laser beams passing through the laser beam tube 18. In the preferred embodiment, laser beam attenuating member 26 is a metallic mesh screen 30 (FIG. 2b) arranged in the laser beam tube 18. Preferably, metallic mesh screen 30 is made of materials selected from the group consisting of brass, steel, copper, and metal alloys. We consider copper to be most preferred because it has more suitable thermal conductivity and reflective characteristics of the wavelengths contemplated by the invention. Moreover, the mesh screen 30 has a plurality of openings 32 (FIG. 2b1). Openings 32 each have a wire diameter in the range of from about 0.00025 inches (0.000635 cm) to about 0.025 inches (0.0635 cm) and a clear opening having a dimension in the range from about 0.001 inches (0.00254 cm) to about 0.100 inches (0.254 cm). In the preferred embodiment, mesh screen 30 has clear opening dimension of 0.055 inches (0.140 cm), and a wire diameter of 0.016 inches (0.041 cm).

As shown in FIG. 2c, alternatively, attenuating member 26 may include at least one beam splitter 27 arranged along the optical path 23 in the laser beam tube 18. Moreover, attenuating member 26 may include a neutral density filter (not shown).

Figure 3:
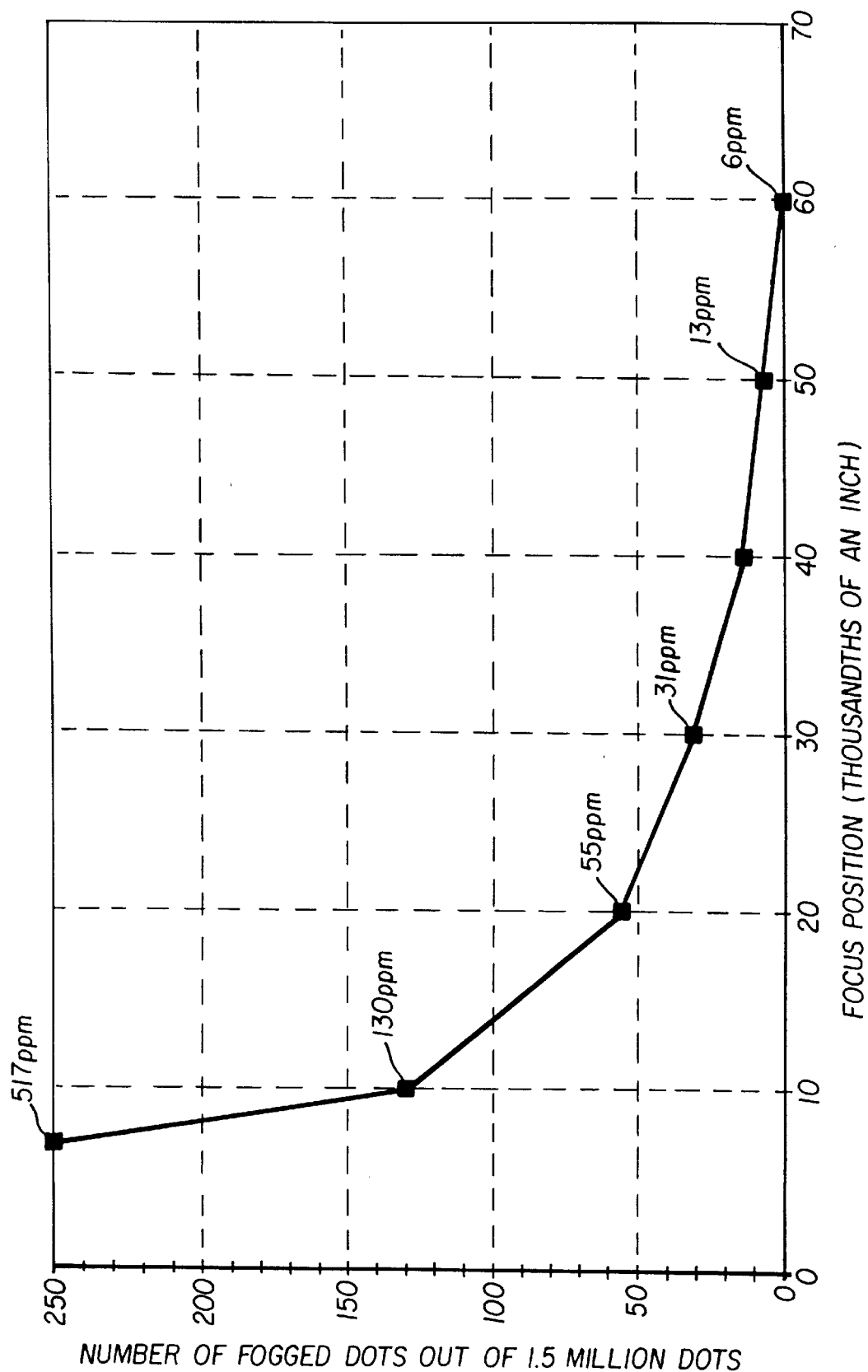
FIG. 3 is a graph of the relationship between focus position effect (inversely proportional to peak power) on fog spots formed on the photosensitive film; and, FIGS. 4 and 5 show the effects of an attenuating screen of the invention on incidents of fog spots.

Referring to FIG. 3, peak power of each of the plurality of lasers 22 was determined to be a primary factor controlling the incidences of fog spots occurring on the photosensitive web material 1 after impingement by laser energy. According to FIG. 3, we observed that the incidences of fog spots decreased as the focus position of the lens 24 moved further out of focus. This corresponded to an effective reduction in peak power that enabled the inventors to select controlling peak power for minimizing the incidences of fog spots.

Figure 4:
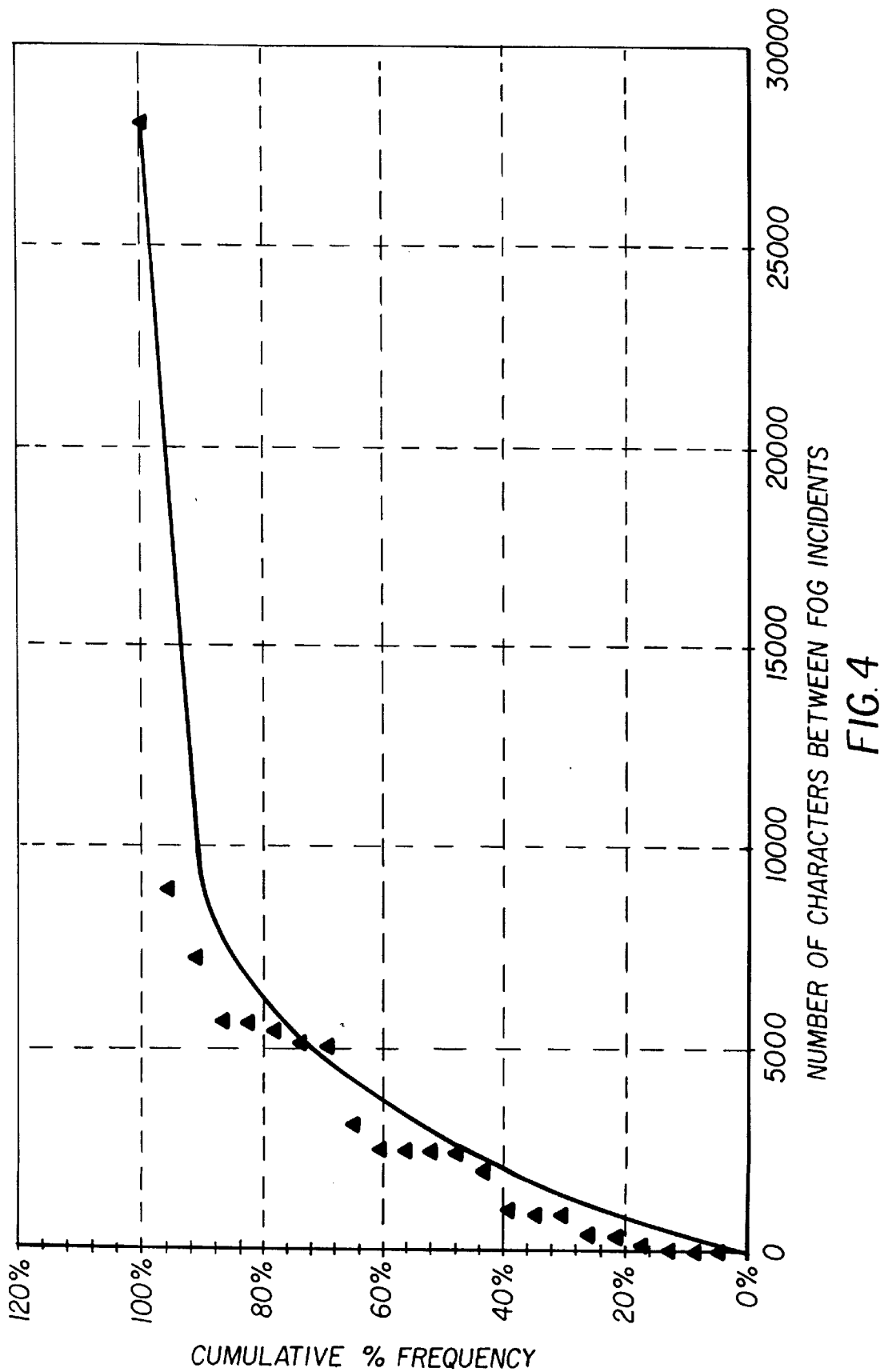
Figure 5:
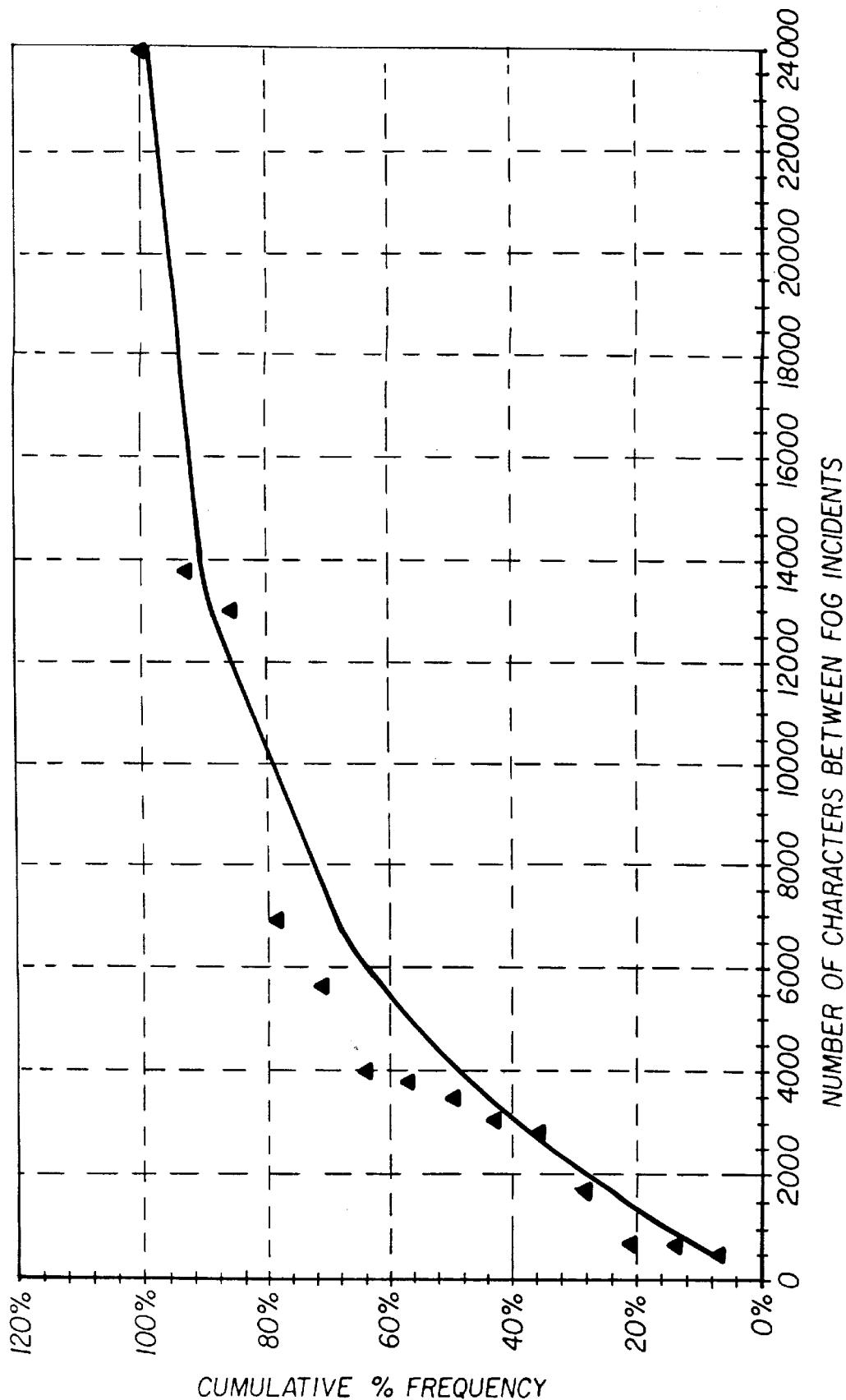

Referring to FIGS. 4 and 5, performance of mesh screens 30 used as attenuating member 26 in the apparatus 10 of the invention are illustrated. According to both FIGS. 4 and 5, the incidences of fog spots are well below expected levels generally experienced in the industry.

In another embodiment of the invention, a method of controlling peak power of a laser marking apparatus 10 adapted for marking predetermined indicia 2 on moving photosensitive web material 1 comprises the steps of providing a source 12 of laser energy. A laser printing means 14 (described above) is structurally connected to the source 12 of laser energy which has a laser head 16, a laser beam tube 18 connected to the laser head 16. As indicated above, the laser beam tube 18 has an active end 20 positioned proximate to the moving photosensitive web material 1. A plurality of lasers 22 is disposed in the laser head 16 for generating a plurality of laser beams. A lens 24 is arranged in the laser beam tube 18, preferably near the active end 20, for focusing each one of the plurality of laser beams along a predetermined optical path 23 and into impinging contact with the moving photosensitive web material 1 thereby producing indicia 2 thereon.

Further, the source 12 of laser energy is activated so as to energize each one of the plurality of lasers 22 for impinging laser beams forming predetermined indicia 2 on the moving photosensitive web material 1. Importantly, the peak power to each one of the plurality of lasers 22 is controlled, as described above, for minimizing fog spots on the photosensitive web material 1.

The invention has been described with reference to a preferred embodiment. However, it will be appreciated that variations and modifications can be effected by a person of ordinary skill in the art without departing from the scope of the invention.

PARTS LIST 1 photosensitive web material
2 indicia
10 apparatus of the invention
12 source of laser energy
14 printer means
16 laser head
18 laser beam tube
20 active end of laser beam tube 18
22 lasers
23 optical path
24 lens
26 means for controlling peak power or laser beam attenuating member
27 beam splitter
30 mesh screen
32 opening in mesh screen 30

What is claimed is:
1. A method of controlling peak power of a radiant energy emitting system, comprising the steps of:
providing a source of radiant energy;

providing a printer structurally connected to said source of radiant energy, said printer being provided with a printer head, a radiant energy beam tube connected to said printer head, said radiant energy beam tube having an active end, a moving photosensitive web for printing indicia thereon, a plurality of radiant energy emitting elements disposed in said printer head for generating a plurality of radiant energy beams, a lens arranged in said radiant energy beam tube for focusing each one of said plurality of radiant energy beams along a predetermined optical path, and means for controlling peak power to each one of said plurality of radiant energy emitting elements, said means comprising a radiant energy beam attenuating member disposed in said optical path for attenuating said plurality of radiant energy beams; and, activating said source of radiant energy so as to energize each one of said plurality of radiant energy emitting elements to direct said plurality of radiant energy beams through said printer onto said photosensitive web.

2. The method recited in claim 1 wherein said step of providing a printer includes the step of preselecting a metallic mesh screen as said radiant energy beam attenuating member.

3. The method recited in claim 2 wherein said step of preselecting said metallic mesh screen further includes selecting said metallic mesh screen from materials selected from the group consisting of brass, steel, copper, and metal alloys.

4. The method recited in claim 2 wherein said step of preselecting said metallic mesh screen further includes the step of orienting said preselected metallic mesh screen in said optical path generally normal to said radiant energy beams.

5. The method recited in claim 2 wherein said step of preselecting said metallic mesh screen further includes the step of arranging said metallic mesh screen in a plane nearest said source of radiant energy.

6. The method recited in claim 2 wherein said step of preselecting said metallic screen further includes the step of arranging said metallic mesh screen in a plane in said radiant energy beam tube between said plurality of radiant energy emitting elements and said lens.

7. The method recited in claim 1 wherein said step of providing a printer includes the step of preselecting a beam splitter as said attenuating member.

8. A method of controlling peak power of a laser energy emitting system, comprising the steps of:

providing a source of laser energy;

providing a laser printer structurally connected to said source of laser energy, said laser printer being provided with a laser printer head, a laser energy beam tube connected to said laser printer head, said laser energy beam tube having an active end, a photosensitive web, a plurality of lasers disposed in said printer head for generating a plurality of laser energy beams, a lens arranged in said laser energy beam tube for focusing each one of said plurality of laser energy beams along a predetermined optical path, and means for controlling peak laser power, said means for controlling comprising a laser beam attenuating member disposed in said optical path for attenuating said plurality of laser energy beams; and, activating said source of laser energy so as to energize each one of said plurality of lasers to direct said plurality of laser energy beams through said laser printer onto said photosensitive web thereby forming indicia thereon.

* * * * *